May 6, 1958  L. B. HUNT, JR  2,833,334
FOLDING AUTOMOBILE TABLE

Filed Jan. 18, 1956  2 Sheets-Sheet 1

INVENTOR.
Letcher B. Hunt, Jr.
BY Paul Fitzpatrick
ATTORNEY

May 6, 1958 L. B. HUNT, JR 2,833,334
FOLDING AUTOMOBILE TABLE
Filed Jan. 18, 1956 2 Sheets-Sheet 2
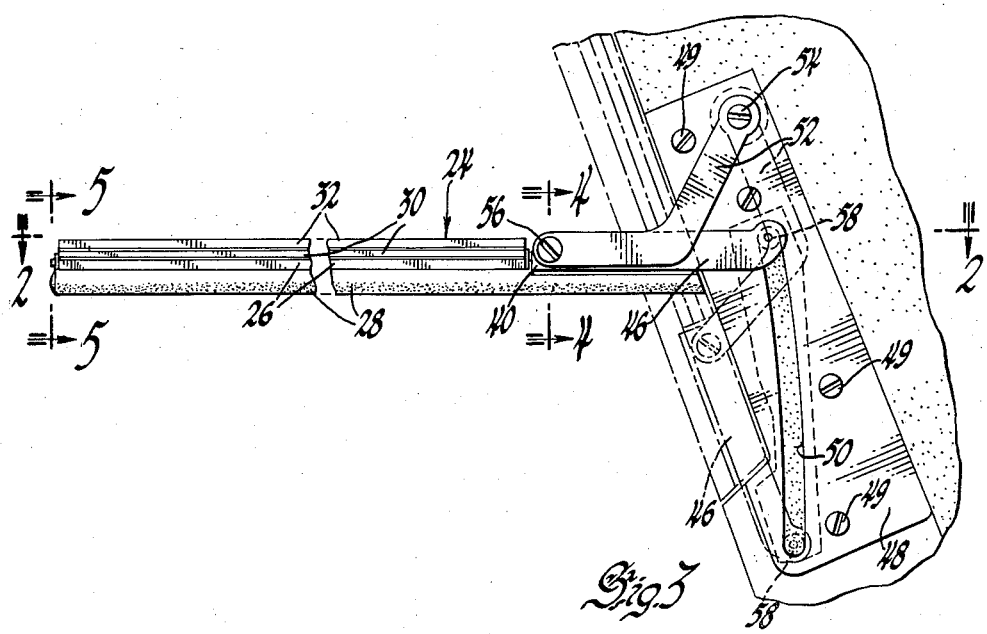
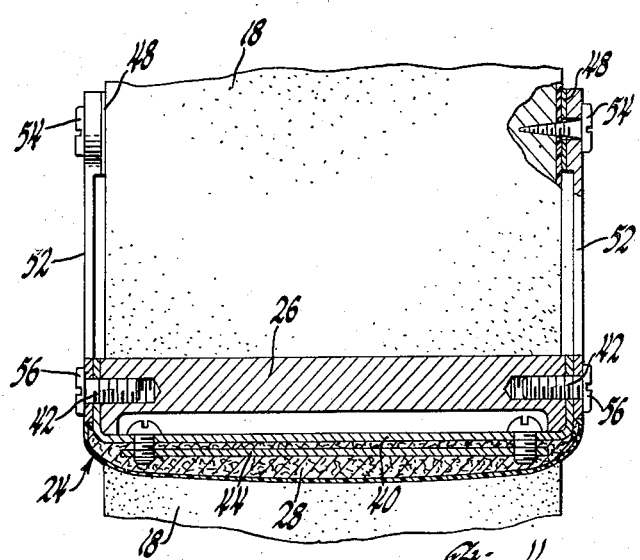
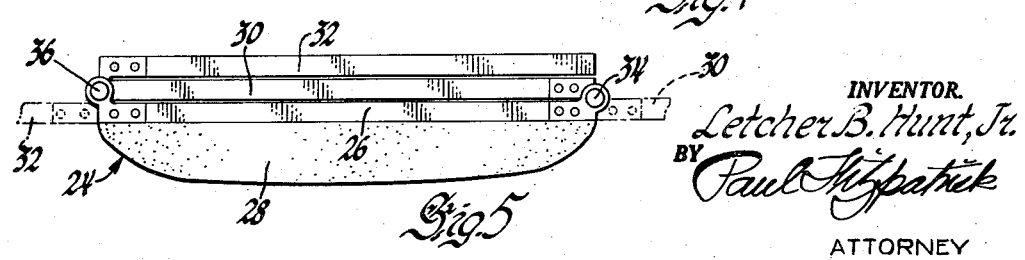
INVENTOR.
Letcher B. Hunt, Jr.
BY Paul Fitzpatrick
ATTORNEY

United States Patent Office 2,833,334
Patented May 6, 1958

2,833,334

FOLDING AUTOMOBILE TABLE

Letcher B. Hunt, Jr., Detroit, Mich., assignor to General Motors Corporation, Detroit, Mich., a corporation of Delaware Application January 18, 1956, Serial No. 559,859

2 Claims. (Cl. 155—123)

This invention relates to a folding table, and more particularly to a folding table swingably mounted on the generally vertical back of an automobile seat.

One feature of the invention is that it provides an improved folding table; another feature of the invention is that it provides a folding table having novel means for swingably mounting the table on the generally vertical back of an automobile seat; a further feature of the invention is that the table comprises a base and at least one leaf hingedly mounted thereon and adapted to be swung to a horizontal position at the side of the base to extend the table surface; and still a further feature of the invention is that the mounting means includes hinge means for swingably mounting the table on the seat back and novel guide means for guiding movement of the table between an out-of-the-way position in the plane of the seat back and a generally horizontal operating position.

Other features and advantages of the invention will be apparent from the following specification and from the drawings, in which:

Fig. 3 is an enlarged vertical section through a portion of the front seat back and the table taken along the line 3—3 of Fig. 1 showing the table in solid lines in operating position and in broken lines in retracted position;

Fig. 4 is a transverse vertical section taken along the line 4—4 of Fig. 3; and

Fig. 5 is a section taken along the line 5—5 of Fig. 3, the table leaves being shown in solid lines in folded position and in broken lines in extended position.

The improved table is particularly adapted for use in an automobile having front and rear seats, the table being swingably mounted on the front seat back and being movable between an out-of-the-way position in the plane of said seat back and an operating position wherein the table extends generally horizontally and is readily accessible for use by passengers in the rear seat of the automobile. The table has a base with intermediate and upper leaves hingedly mounted thereon, the leaves being swingable to a horizontal position at opposite sides of the base to extend the table surface.

Figure 1:
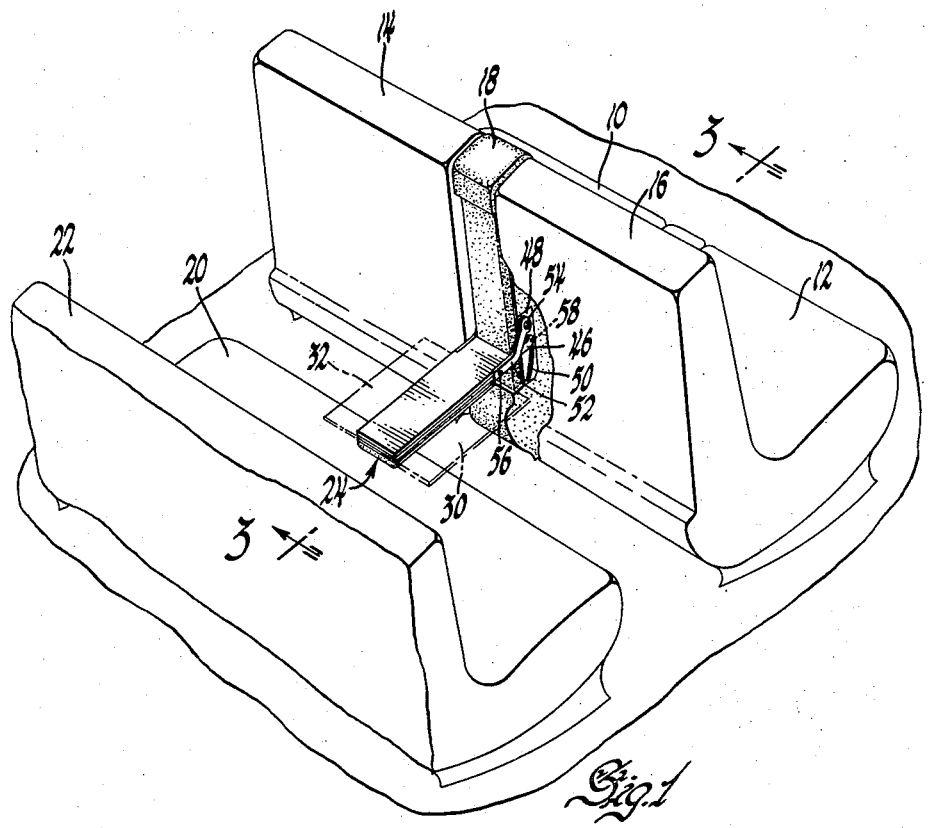
Fig. 1 is an isometric view of the front and rear seats of an automobile, the improved folding table being mounted on the front seat back and the table leaves being shown in solid lines in folded position and in broken lines in extended position.

Referring now more particularly to the drawings, the passenger compartment of an automobile is shown fragmentarily in Fig. 1. Within the compartment there is a front seat including cushions 10 and 12 and seat backs 14 and 16. While there might, if desired, be only a single seat instead of the two separate seats illustrated, the compartment shown in the drawings includes separate driver's and passengers' seats separated by a stanchion 18 which conforms in shape generally to the cushions and seat back.

The rear seat comprises a single cushion 20 and back rest 22 which extend across the rear passenger compartment.

The improved table, which is designated generally as 24, is swingable between a generally vertical out-of-the-way position where it lies in the plane of the seat back and a generally horizontal operating position.

Figure 2:
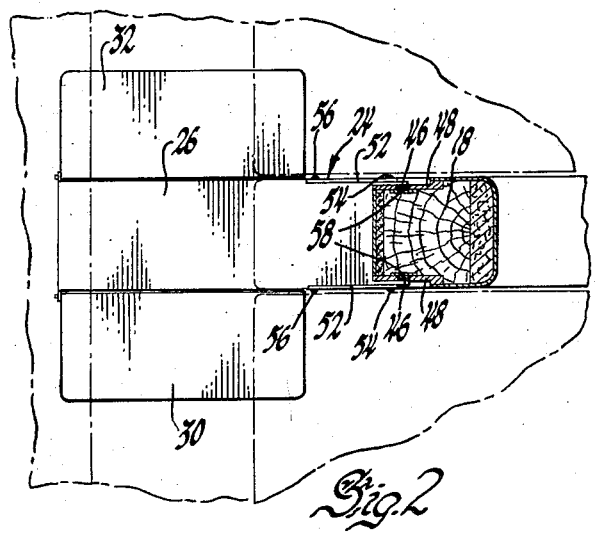
Fig. 2 is a fragmentary top plane view of a portion of the structure in Fig. 1 showing the table leaves in extended position.

The table comprises a base 26 which on its under surface (referring to the parts when in the horizontal operating position) has padding material 28 so formed that when the table is in its out-of-the-way position, it merges with and appears to be a part of the stanchion 18. The base 26 carries an intermediate leaf 30 and an upper leaf 32. As shown in Fig. 5, the intermediate leaf 30 is hinged to the base at one side at 34 so that it is swingable through an arc of 180 degrees from a stacked position atop said base to a horizontal position as fragmentarily shown in broken lines and as shown in Figs. 1 and 2, wherein the intermediate leaf lies in the plane of the base 26. Similarly, the upper leaf 32 is hingedly mounted at 36 on the opposite side of the base so that it is swingable through an arc of 180 degrees to a horizontal position in the plane of the base to extend the table surface as shown best in Figs. 1 and 2.

Referring to Fig. 4, a channel-shaped hinge mounting plate 40 is secured to the table base member adjacent one end thereof by screws 42 and a tapping plate 44 embedded in the padded member 28 and screwed to the base portion of the channel-shaped hinge mounting plate secures the padded member 28 to the base at one end. At each side of the table member a guide projection 46 extends beyond the end of the table, these guide projections preferably being formed integrally with the hinge mounting plate.

A pair of support brackets 48 are mounted in spaced relationship on the stanchion 18, each bracket having a curved guide slot 50 therein. A pair of hinge arms 52 each of dog-leg configuration swingably mount the table 24 on the support brackets 48. One end of each hinge arm is pivotally connected at 54 to one of the support brackets 48 and the other end of each arm is pivotally connected at 56 to the hinge mounting brake 40, one hinge arm being located at each opposite side of the table member. Rollers 58 movably connect each of the guide projections 46 of the mounting plate in the slot 50 in a different one of said support brackets. The hinge arm 52 and guide projections 46 support and guide the table member in swinging between an out-of-the-way position as shown in broken lines in Fig. 3 wherein the table member lies up against the stanchion in the plane of the seat back, and a generally horizontal operating position as shown in solid lines in Fig. 3 and as shown in Figs. 1 and 2. When in the operating position, the leaf members 30 and 32 may be swung out to extend the table surface as shown in broken lines in Figs. 1 and 5 and in solid lines in Fig. 2. The improved guide and hinge support means for the table provide a firm mounting and at the same time permit easy swinging between out-of-the-way and operative positions. As shown in broken lines in Fig. 3, when the table is in its out-of-the-way position the hinge arms and guide means are concealed from view.

While I have shown and described one embodiment of my invention, it is capable of many modifications. Changes, therefore, in the construction and arrangement may be made without departing from the spirit and scope of the invention as set forth in the appended claims.

I claim:

1. In combination in an automobile, a front seat back lying in a generally vertical plane, a table member, guide projections mounted on said table member and extending beyond one end thereof in the plane of the table member, guide means movably connecting said projections to said seat back to provide for swinging movement of said table member from an inoperative position in the plane of said seat back to an operative position in a horizontal plane, and hinge links having one arm pivotally connected at one end to said table member and another arm pivotally connected to said seat back, said hinge links being formed as dog legs and said one arm lying in the plane in which said table member lies, from the point of pivotal mounting of said arm to a location adjacent the seat back when the table member is in its operative position.

2. In combination in an automobile, a front seat back lying in a generally vertical plane, a table member comprising a base, an intermediate leaf member and an upper leaf member, and means for pivotally mounting of said leaf members at opposite sides of said base, whereby said leaf members can be swung to a horizontal position, one at each side of said base, when the table member is in an operating position, a hinge mounting plate secured to said table member adjacent one end thereof, said mounting plate having guide projections extending beyond said end of the table member at opposite sides thereof in the plane of the table member, a pair of support brackets mounted in spaced relationship on the seat back, each bracket having a guide slot therein, the guide projections being slidably and pivotally connected in said guide slots to provide for swinging movement of said table from an inoperative position in the plane of said seat back to an operative position in a horizontal plane, a pair of hinge links, each having one arm pivotally connected at one end to said hinge mounting plate along one side of the table member and each having another arm pivotally connected to one of said support brackets, one hinge link being located at each opposite side of the table member, said hinge links being formed as dog legs and said one arm of each link lying in the plane in which said table member lies from the point of pivotal mounting of said arm to a location adjacent the seat back when the table member is in its operative position.

References Cited in the file of this patent

UNITED STATES PATENTS

| | | |
|---|---|---|
| 1,712,704 | Kiser | May 14, 1929 |
| 1,790,468 | Frank et al. | Jan. 27, 1931 |
| 1,809,866 | Riesche | June 16, 1931 |
| 1,893,458 | Tatum | Jan. 3, 1933 |
| 2,168,210 | Hawksley | Aug. 1, 1939 |
| 2,184,047 | King | Dec. 19, 1939 |
| 2,284,811 | Ferrelle | June 2, 1942 |
| 2,383,125 | Hill | Aug. 21, 1945 |
| 2,619,395 | Kent | Nov. 25, 1952 |
| 2,719,066 | Budzinski | Sept. 27, 1955 |

FOREIGN PATENTS

| | | |
|---|---|---|
| 345,298 | Great Britain | Mar. 17, 1931 |